United States Patent
Comproni et al.

[19]

[11] Patent Number: 6,143,048
[45] Date of Patent: Nov. 7, 2000

[54] PORTABLE AIR POLLUTION CAPTURE APPARATUS WITH PAINTING TRAY

[75] Inventors: Arnold Comproni, Sylmar; Jorge Millan, Lawndale, both of Calif.

[73] Assignee: Northrop Grumman Corporation, Los Angeles, Calif.

[21] Appl. No.: 09/271,796

[22] Filed: Mar. 18, 1999

Related U.S. Application Data

[63] Continuation-in-part of application No. 08/795,626, Feb. 6, 1997.

[51] Int. Cl.[7] ............................. B01D 29/50; B01D 50/00
[52] U.S. Cl. ............................. 55/356; 55/385.1; 55/419; 55/467; 55/482; 118/326
[58] Field of Search ............................. 55/467, 471, 472, 55/473, 486, 356, 357, 385.1, 418, 419, DIG. 18, DIG. 46, 482; 454/54; 118/326

[56] References Cited

U.S. PATENT DOCUMENTS

| | | | |
|---|---|---|---|
| 2,347,334 | 4/1944 | Schmieg | 55/471 |
| 2,347,728 | 5/1944 | Bell | 183/107 |
| 3,719,030 | 3/1973 | Blankemeyer et al. | 55/356 |
| 4,163,650 | 8/1979 | Watson et al. | 55/126 |
| 4,218,963 | 8/1980 | Burnetter | 98/115 |
| 4,245,551 | 1/1981 | Berkmann | 98/115 |
| 4,354,451 | 10/1982 | Vohringer et al. | 118/326 |
| 4,378,728 | 4/1983 | Berkmann | 98/115 |
| 4,450,900 | 5/1984 | Nathan | 165/42 |
| 4,512,245 | 4/1985 | Goldman | 98/115.4 |
| 4,532,886 | 8/1985 | Bouchard | 118/326 |
| 4,590,884 | 5/1986 | Kreeger et al. | 118/308 |
| 4,662,309 | 5/1987 | Mulder | 118/312 |
| 4,664,060 | 5/1987 | Roberts | 118/326 |
| 4,695,299 | 9/1987 | Spadaro et al. | 55/274 |
| 4,723,971 | 2/1988 | Caldas | 55/276 |
| 5,061,510 | 10/1991 | Nussbaumer et al. | 427/28 |
| 5,103,760 | 4/1992 | Johnson | 118/309 |
| 5,107,756 | 4/1992 | Diaz | 454/53 |
| 5,244,499 | 9/1993 | Mazakas | 118/309 |
| 5,245,763 | 9/1993 | Neikter | 34/22 |
| 5,267,371 | 12/1993 | Soler et al. | 15/327.5 |
| 5,281,246 | 1/1994 | Ray et al. | 55/302 |
| 5,305,494 | 4/1994 | Candler | 15/304 |
| 5,326,599 | 7/1994 | Shutic | 427/478 |
| 5,393,345 | 2/1995 | Smith | 118/312 |
| 5,397,394 | 3/1995 | Orr | 118/634 |
| 5,413,619 | 5/1995 | Volk et al. | 55/327 |
| 5,591,244 | 1/1997 | Vross et al. | 55/356 |
| 5,688,297 | 11/1997 | Spengler | 55/356 |

FOREIGN PATENT DOCUMENTS

| | | | |
|---|---|---|---|
| 8200382 | 9/1982 | Germany | 55/467 |
| 4298212 | 10/1992 | Japan . | |

*Primary Examiner*—David A. Simmons
*Assistant Examiner*—Robert A. Hopkins
*Attorney, Agent, or Firm*—Terry J. Anderson; Karl J. Koch, Jr.

[57] ABSTRACT

An air pollution control apparatus for capturing airborne pollutants present in a relatively confined environment. The apparatus includes a portable airborne-pollutant capturing device movable to a site of pollutant origin and having at least one airborne-pollutant collector member which can be non-limitedly exemplified as a collection hood positionable at the site of pollution for pollutant collection or a painting tray upon which items can be placed and painted and beneath which resultant pollutant can be collected. A vacuum system is present within the capturing device and is in communication with the one or more collector members to draw airborne pollutants into the capturing device through the pollutant collector member. Actual capture of pollutants is accomplished by a filter system within the capturing device. The filter system can include one filter or more than one identical or different filters chosen for enhanced filtration capabilities in relation to pollutants present. Preferably, more than one type of filter can be accommodated simultaneously to thereby capture multiple pollutants.

11 Claims, 3 Drawing Sheets

PORTABLE AIR POLLUTION CAPTURE APPARATUS WITH PAINTING TRAY

CROSS REFERENCE TO RELATED APPLICATION

This application is a continuation-in-part application of U.S. patent application Ser. No. 08/795,626, filed Feb. 6, 1997.

FIELD OF THE INVENTION

This invention relates in general to air pollution control equipment, and in particular to a portable airborne-pollutant capturing device movable to a site of pollutant origin for withdrawing therefrom pollutants such as paint spray, dust particulate and dust odors and capturing these pollutants in an integral filter system.

BACKGROUND OF THE INVENTION

The danger of toxic emissions in confined spaces is well recognized in present day efforts to control airborne pollutants and their potential health hazards. One particularly well-defined example of this control is found in paint booths used for painting aircraft, vehicles, etc. These booths are closed and are designed to substantially encompass the article being painted, and painting proceeds as a spray coating. The booths are equipped with exhaust fans that draw airborne pollution from the booth for collection downstream. When an entire object is being painted, such a booth is highly efficient in protecting persons in the proximity of the painting activity.

While an entire object may be painted in a such a booth, the application of touch-up paint to only a portion of an object generally must be performed in a relatively open area without the protection of a booth or other walled environment. Further, the application of paint to small parts on a random basis makes it impractical to construct a spray booth for infrequent use or in a situation where traveling the distance to a constructed spray booth may not justify the effort. Consequently, dangerous airborne pollutants such as volatile organic compounds, chromium VI, and other components of paint can enter a relatively confined environment (e.g. the interior of a building) and be a safety hazard to people within that environment. Because it is not feasible to construct closed booths or the like for touch-up painting or occasionally painting small parts since such painting may be required at several random sites, fugitive particulate simply enters the relatively confined environment, thus either requiring protective apparel for those nearby or causing a health risk to unprotected personnel.

In view of potential health risks due to non-confinable airborne pollutants, it is apparent that a need is present for particulate capture in environments where individual well-being can be jeopardized. Accordingly, a primary object of the present invention is to provide a mobile air pollution control apparatus movable to a site of pollutant origin.

Another object of the present invention is to provide a mobile air pollution control apparatus having a filter system for trapping and retaining fugitive pollutants.

Yet another object of the present invention is to provide a mobile air pollution control apparatus whose filter system can be customized for favorable efficiency with respect to pollutants to be captured.

Still another object of the present invention is to provide a mobile air pollution control apparatus including a paint station therewith in communication with a filter system for trapping and retaining fugitive pollutants generated behind an item such as a small part as paint is applied to that item.

These and other objects of the present invention will become apparent throughout the description thereof which now follows.

SUMMARY OF THE INVENTION

The present invention is an air pollution control apparatus usable for capturing airborne pollutants present in a relatively confined environment. The apparatus comprises a portable airborne-pollutant capturing device movable to a site of pollutant origin and having at least one airborne-pollutant collector member which can be non-limitedly exemplified as a collection hood positionable at the site of pollution for pollutant collection or a painting tray upon which items can be placed and painted and beneath which resultant pollutant can be collected. A vacuum system is present within the capturing device and is in communication with the one or more collector members to draw airborne pollutants into the capturing device through the pollutant collector member. Actual capture of pollutants is accomplished by a filter system within the capturing device. The filter system can include one filter or more than one identical or different filters chosen for enhanced filtration capabilities in relation to pollutants present. Thus, an activated charcoal filter may be included in the filter system for trapping and retaining volatile organic compounds (VOC's), a paint over-spray filter may be included for chromium VI and other metallic contaminates associated with paint, while a high efficiency particulate air (HEPA) filter is included to assure general pollutant collection. Preferably, more than one type of filter can be accommodated simultaneously to thereby capture multiple pollutants. Fugitive particulate is captured by juxtapositioning the airborne-pollutant collector member and the activity causing pollution (e.g. touch-up painting, random painting of small parts, etc.), and operating the collector member simultaneously with the activity to thereby cause potentially polluting particulate to be drawn within the airborne-pollutant capturing device and there captured by the filter system. In this manner airborne pollutant escape is significantly curtailed.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
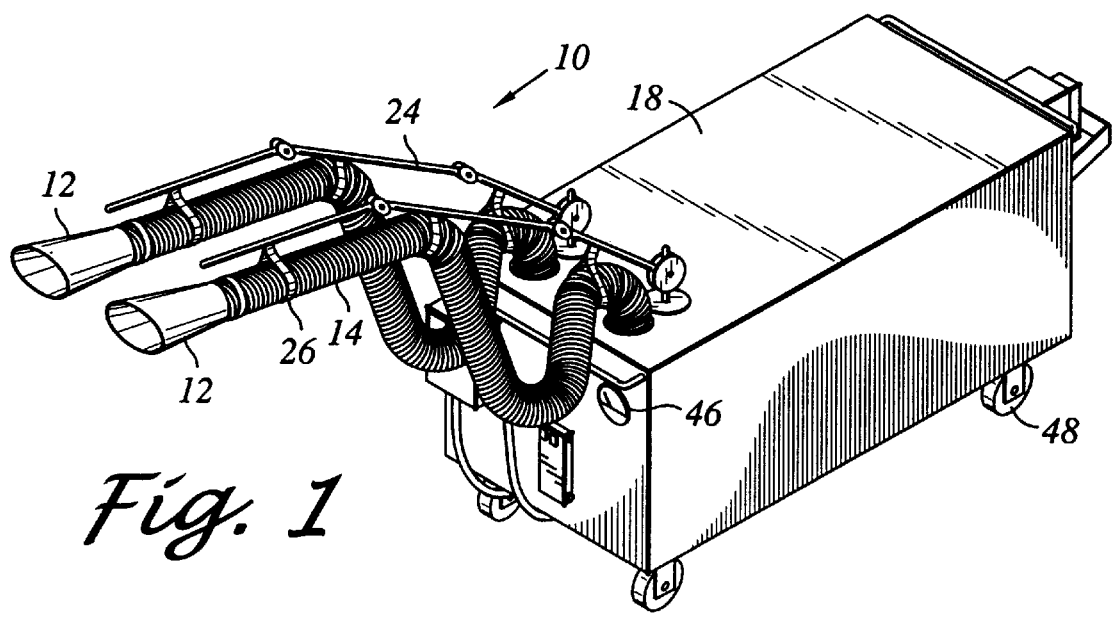
FIG. 1 is a perspective view of an air pollution control apparatus.
Figure 2:
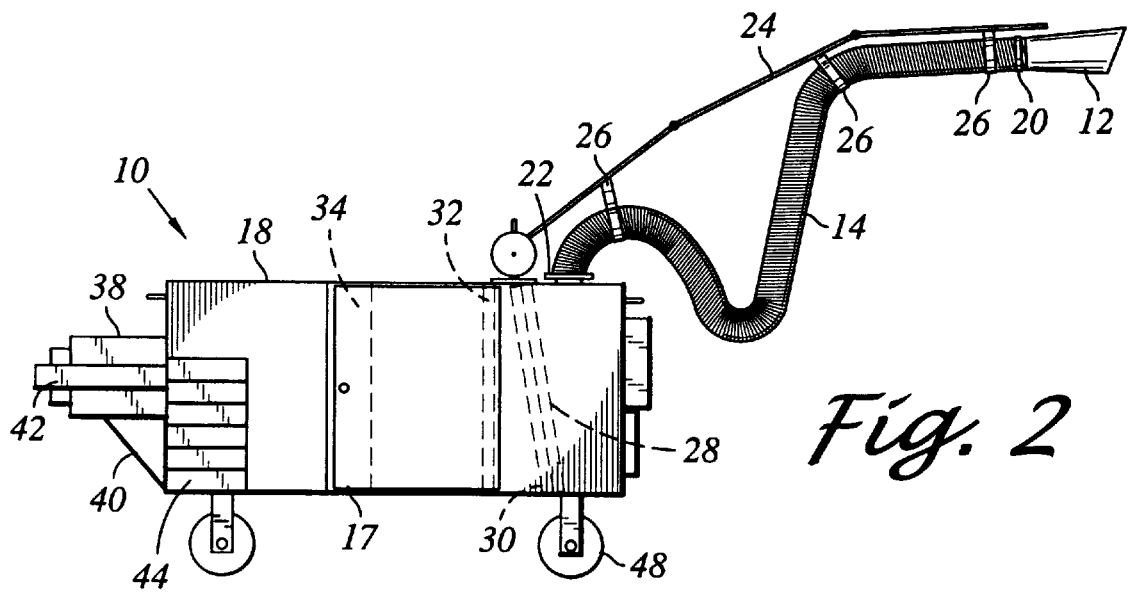
FIG. 2 is a side elevation view of the air pollution control apparatus of FIG. 1.
Figure 3:
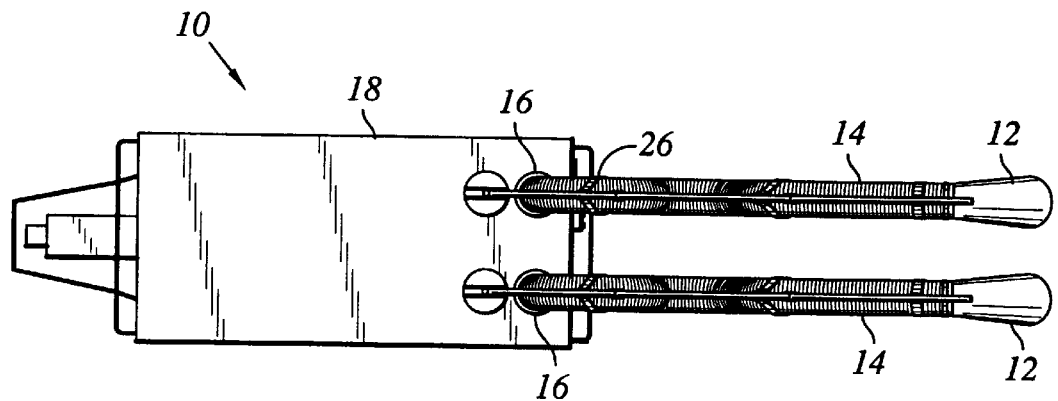
FIG. 3 is a top plan view of the apparatus of FIG. 1.

Referring to FIGS. 1–3, an air pollution control apparatus 10 is shown. The apparatus 10 has two cone hoods 12 of identical construction as airborne-pollutant collector members. Each hood 12 is in communication with a flexible hose 14 leading from the proximal end of the hood 12 to respective housing inlets 16 of the housing 18. Respective conventional clamps 20, 22 retain ends of each hose 14 to, respectively, each hood 12 and each housing inlet 16. An articulating external support 24 is associated with each hose 14 and connected thereto with a plurality of straps 26.

Figure 4:
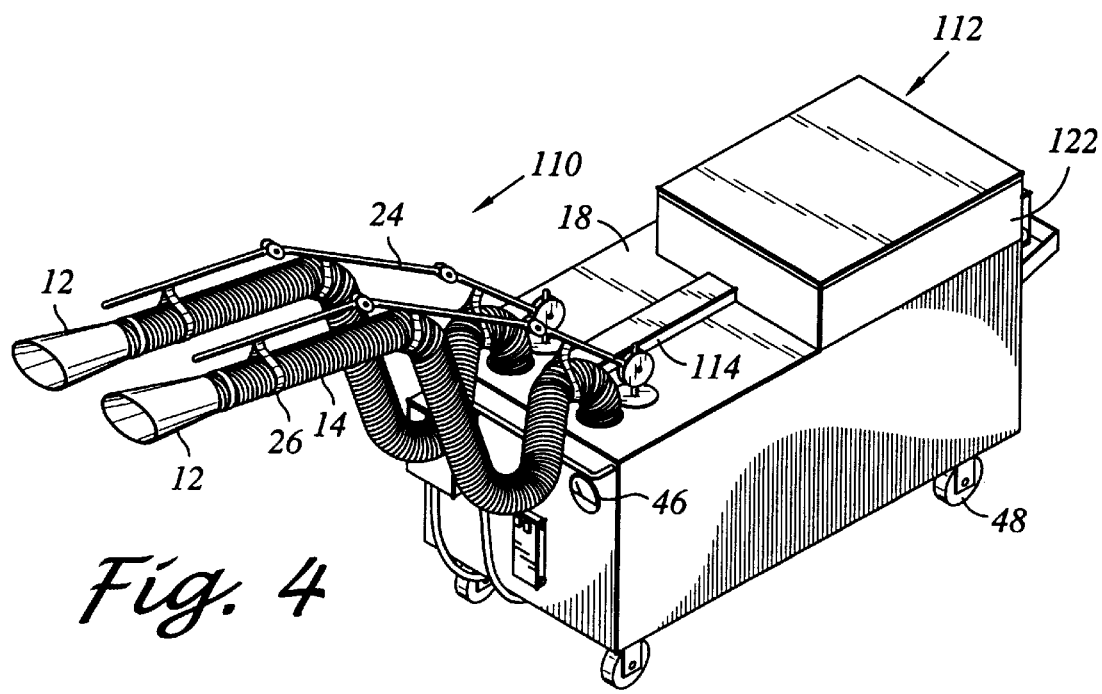
FIG. 4 is a perspective view of a second embodiment of an air pollution control apparatus additionally including a painting tray unit in a closed configuration.
Figure 5:
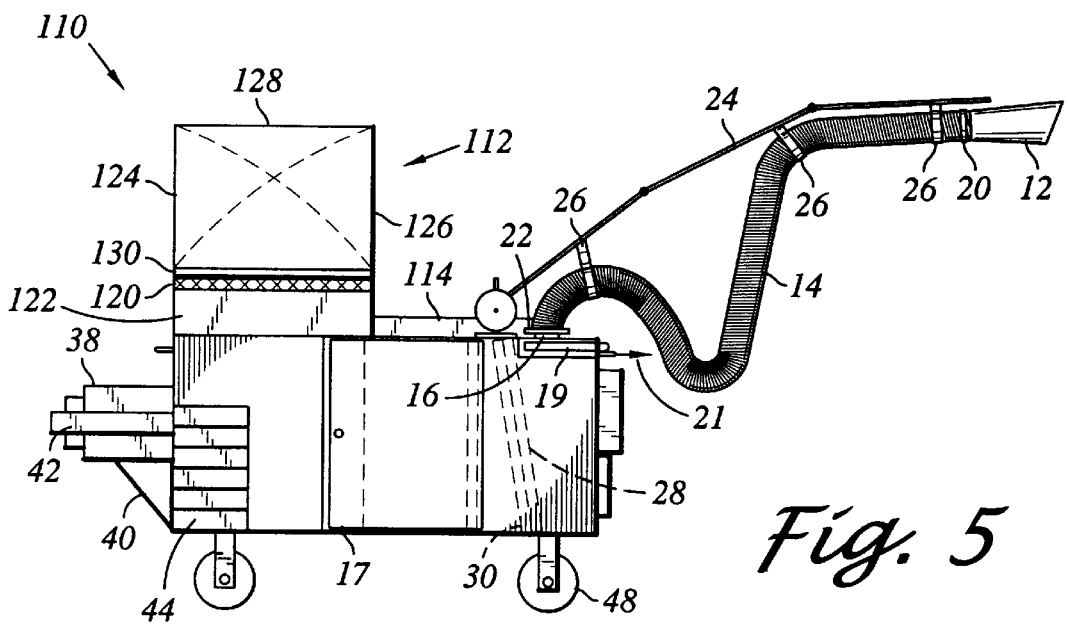
FIG. 5 is a side elevation view of the air pollution control apparatus of FIG. 4 with the painting tray unit in an open configuration.
Figure 6:
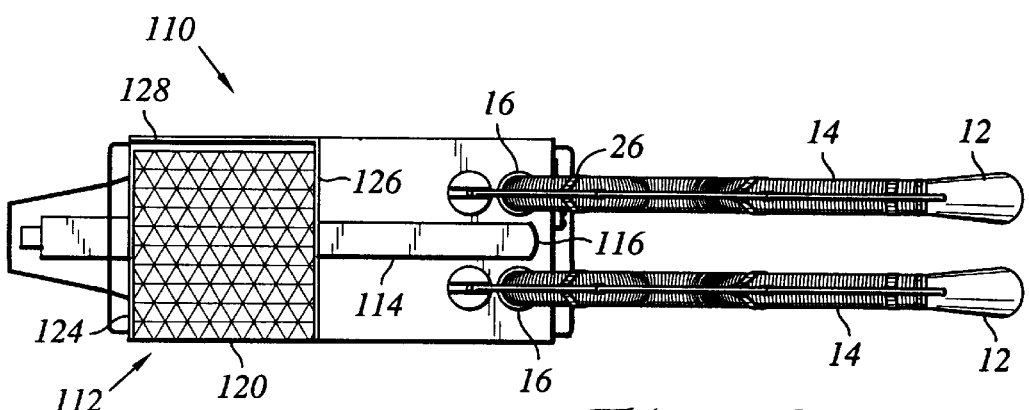
FIG. 6 is a top plan view of the air pollution control apparatus of FIG. 4 with the painting tray unit in an open configuration.

FIGS. 4–6 illustrate a second embodiment of an air pollution control apparatus 110. In addition to including all of the components described immediately above, the apparatus 110 includes a painting tray 112 as an airborne-pollutant collector member. The painting tray 112 is in communication with a tray pollutant collector member which here is a duct 114 leading from the tray 112 to a housing inlet 116 of the housing 18. A metal mesh platform 120, non-limitedly constructed of aluminum, is situated over and forms the top of a housing 122 from which the duct 114 leads. The painting tray 112 has two folding side walls 124, 126 and one folding rear wall 128 (as positioned during operator use as described later) illustrated as closed in FIG. 4 and open in FIGS. 5 and 6 to thereby create a paint station above the mesh platform 120 and surrounded on three sides for painting small parts (not shown) and the like. The folding travel paths of the side walls 124, 126 are shown in phantom lines in FIG. 5. If desired, the side walls 124, 126 can be shaped to have a downwardly-sloping portion from back to front to thereby permit peripheral vision recognition for a operator during paint applications. A honeycomb cardboard filter 130 (FIG. 5) can be placed on top of the mesh platform 120 during painting operations to thereby maintain the mesh platform 120 free of paint. All of the inlets 16, 116 can be provided with identical sliding closure doors 19, slidable as shown by the arrow 21, as illustrated in FIG. 5, that can be positioned to block any of the inlets 16, 116 not in use at a particular time. Thus, if only the painting tray 112 is in operation, only the inlet 116 leading from the duct 114 need be open. Conversely, if only the hoods 12 are in use, the inlet 116 can be closed while the inlets 16 remain open to receive pollutant airflow.

A door 17 (shown in FIGS. 2 and 5) closes and seals the housing 18 so that a pressure differential can be established to thereby draw air into the housing 18 through the cones 12 and/or duct 114 leading from beneath the mesh platform 120 of the painting tray 112. Situated within the housing 18 are a plurality of filters for trapping and retaining fugitive pollutants. In particular, a primary filter 28 and secondary filter 30 are situated substantially immediately proximate from the housing inlets 16 to thereby be the first filters to receive aspirated intake through the hoods 12. The primary and secondary filters 28, 30 can be Ultra/OSM filters as manufactured by ATI Technologies, Inc., Santa Ana, Calif., and are especially functional in capturing and retaining particulate matter greater than 10 microns in size. Disposed proximate from the primary and secondary filters 28, 30 can be an activated carbon filter 32 such as an IAQ-99 Filter as manufactured by Airguard Industries, Corona, Calif., especially useful in trapping volatile organic compounds through adsorption. Immediately proximal to the carbon filter 32 is a high efficiency particulate air (HEPA) filter 34 which can be as manufactured by Farr Co., Hawthorne, Calif., Catalog No. 242412, or equivalent. Employment of a HEPA filter 34 as a final destination of drawn pollutants helps to assure capture efficiency of the air pollution control apparatus 10.

Also disposed within the housing 18 is a vacuum system comprising a conventional fan (not shown) driven by a motor 38 supported by a bracket 40 and protected by a guard member 42. Slanted air louver vents 44 permit passage of exhaust air after passage through the filter system. A pressure differential gage 46 such as a Magnetic Gage Model 2005C, or equivalent, manufactured by Dwyer Instruments, Inc., Michigan City, Ind., is provided to indicate filter efficiency and cleanliness as reflected by air flow for filter-replacement indication purposes. The pressure differential range should be between 1–10 inches of water depending on the type of filters. Mobility is provided by four standard wheel assemblies 48 each having a brake for stationery placement at a pollution site.

In operation of the embodiment of FIGS. 1–3, an operator moves the air pollution control apparatus 10 to a location of expected airborne-pollutant production, as can be non-limitedly exemplified by a spray paint touch-up site in an enclosed building where fugitive components of the paint represent anticipated particulate pollution. The cone hoods 12 are then positioned as close as possible to the paint application site, the control apparatus 10 is activated to cause air flow through the hoods 12 and hoses 14 into the housing 18, and paint application occurs. While an extremely high percentage of paint components are deposited on the surface being painted, a significant quantity of fugitive components such as chromium VI, as well as volatile organic compounds, are drawn within the hoods 12 for capture within the filter system. Because the filter system employs removable and changeable filters, a user can select specialized filters for specific expected particulate. Thus, for example, if pollutant particulate is best collected by adsorption on activated carbon, such carbon filters can be used extensively or exclusively within the housing 18 to customize and maximize pollution control.

In operation of the embodiment of FIGS. 4–6, an operator moves the air pollution control apparatus 10 to a location of expected airborne-pollutant production, as can be non-limitedly exemplified by a spray paint site in an enclosed building where fugitive components of the paint represent anticipated particulate pollution. One or more articles to be painted are positioned at the paint station on the honeycomb cardboard filter 130 disposed on top of the mesh platform 120, the control apparatus 110 is activated to cause air flow through the mesh platform 120 and duct 114 into the housing 18, and paint application as by spray is commenced on the articles. In the same manner as described above, although an extremely high percentage of paint components are deposited on the surfaces being painted, a significant quantity of like fugitive components are drawn through the honeycomb cardboard filter 130, the mesh platform 120, and duct 114 for ultimate capture within the filter system as earlier related.

Use of air pollution control apparatus here described and claimed can significantly help in maintaining environmentally safe work places while allowing a practical approach in manufacturing procedures. While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A portable air pollution control apparatus for capturing airborne pollutants, said apparatus comprising:

a) a wheeled, single chamber mobile housing generally air-tight when in a closed configuration and having a generally non-obstructed linear flow path for incoming pollutant-containing air upon collection until filtration thereof, said housing hand movable while in operation within a space and having a painting tray upon which an item can be placed and painted and from which pollutant from a paint spray can be collected through an intake opening of a tray pollutant collector member in air flow communication with said painting tray, said tray having a plurality of sides with one side thereof walless and with all other sides thereof having upwardly extending generally vertical walls wherein said walls are foldable upon the painting tray;

b) a vacuum system within the mobile housing in air flow communication with the pollutant collector member to draw airborne pollutants into the mobile housing through said collector member and to a filter system; and c) a filter system comprising a plurality of removable filters within the mobile housing and to which airborne pollutants drawn into said housing from the pollutant collector member are delivered to be to trapped and retained.

2. A portable air pollution control apparatus as claimed in claim 1 wherein the painting tray comprises a mesh platform.

3. A portable air pollution control apparatus as claimed in claim 2 wherein the intake opening of the tray pollutant collector member is disposed beneath the painting tray.

4. A portable air pollution control apparatus as claimed in claim 1 wherein the tray pollutant collector member is a duct.

5. A portable air pollution control apparatus as claimed in claim 1 wherein the painting tray is four-sided.

6. A portable air pollution control apparatus for capturing airborne pollutants, said apparatus comprising:

a) a wheeled, single chamber mobile housing generally air-tight when in a closed configuration and having a generally non-obstructed linear flow path for incoming pollutant-containing air upon collection until filtration thereof, said housing hand movable while in operation within a space to a point source site within said space where pollution is originating, and having at least one flexible, extendably maneuverable pollutant collector member having at least one articulatable exterior support structure and a distal end in air flow communication with and positionable at a point source site of pollutant origin, and having a painting tray upon which an item can be placed and painted and from which pollutant from a paint spray can be collected through an intake opening of a tray pollutant collector member in air flow communication with said painting tray;

b) a vacuum system within the mobile housing in air flow communication with the at least one flexible, extendably maneuverable pollutant collector member and the tray pollutant collector member to draw airborne pollutants into the mobile housing through said collector members and to a filter system; and c) a filter system comprising a plurality of removable filters within the mobile housing and to which airborne pollutants drawn into said housing from the pollutant collector members are delivered to be to trapped and retained.

7. A portable air pollution control apparatus as claimed in claim 6 wherein the painting tray comprises a mesh platform.

8. A portable air pollution control apparatus as claimed in claim 7 wherein the intake opening of the tray pollutant collector member is disposed beneath the painting tray.

9. A portable air pollution control apparatus as claimed in claim 6 wherein the tray pollutant collector member is a duct.

10. A portable air pollution control apparatus as claimed in claim 6 wherein the painting tray is four-sided and wherein generally vertical walls extend upwardly along three sides of the said painting tray.

11. A portable air pollution control apparatus as claimed in claim 10 wherein the vertical walls are foldable upon the painting tray.

* * * * *